__PAGE_START__United States Patent Office

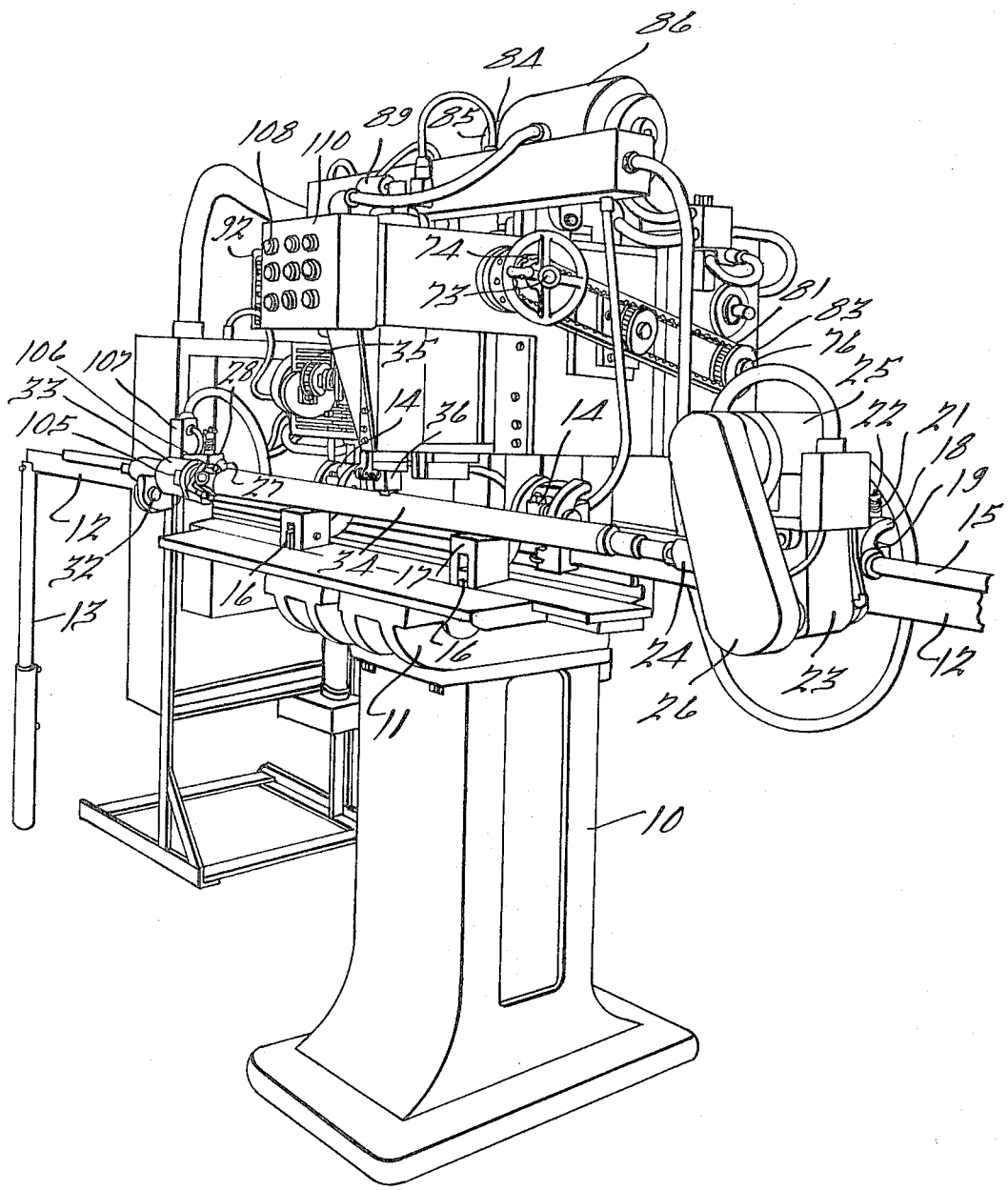

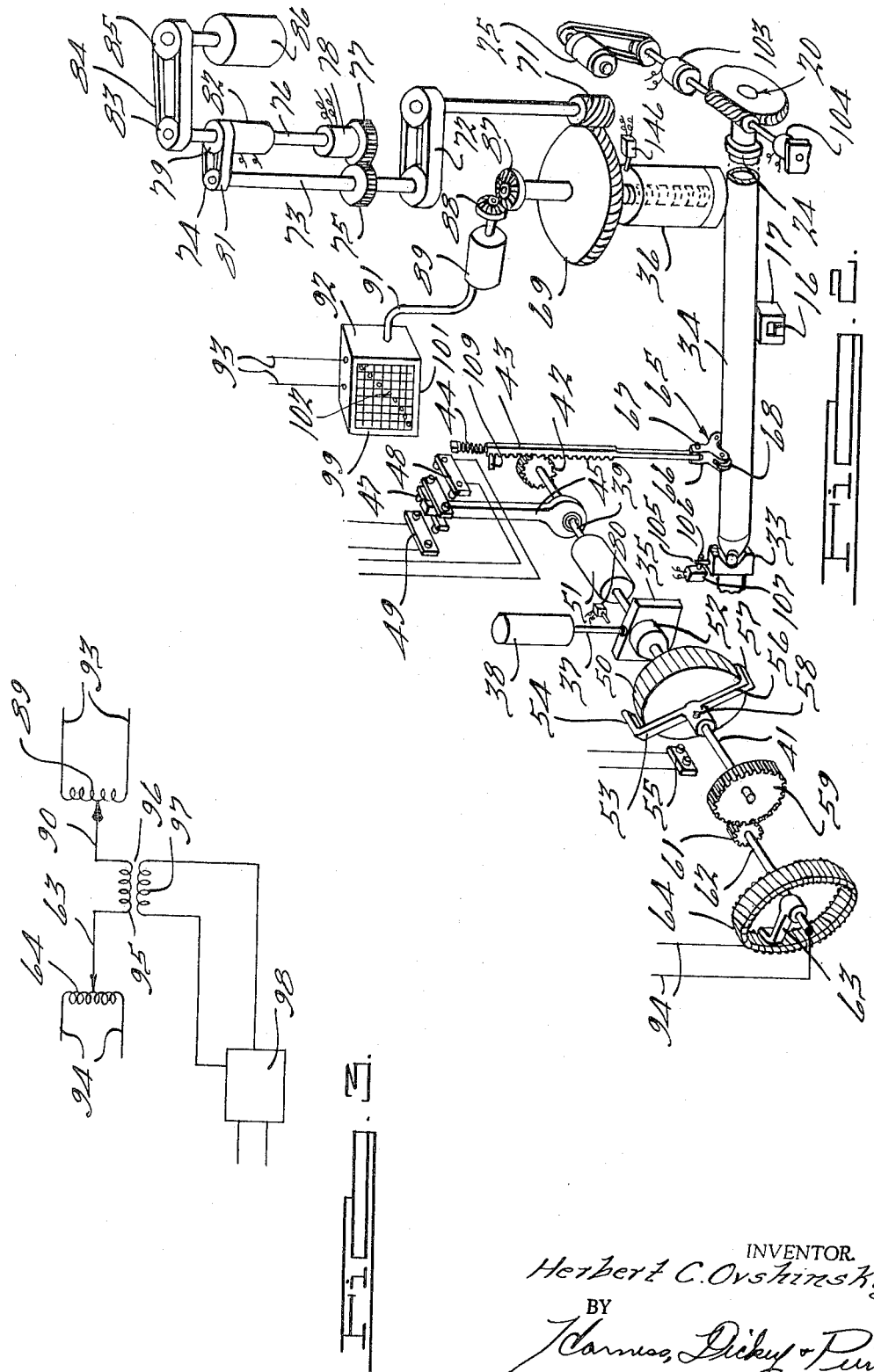

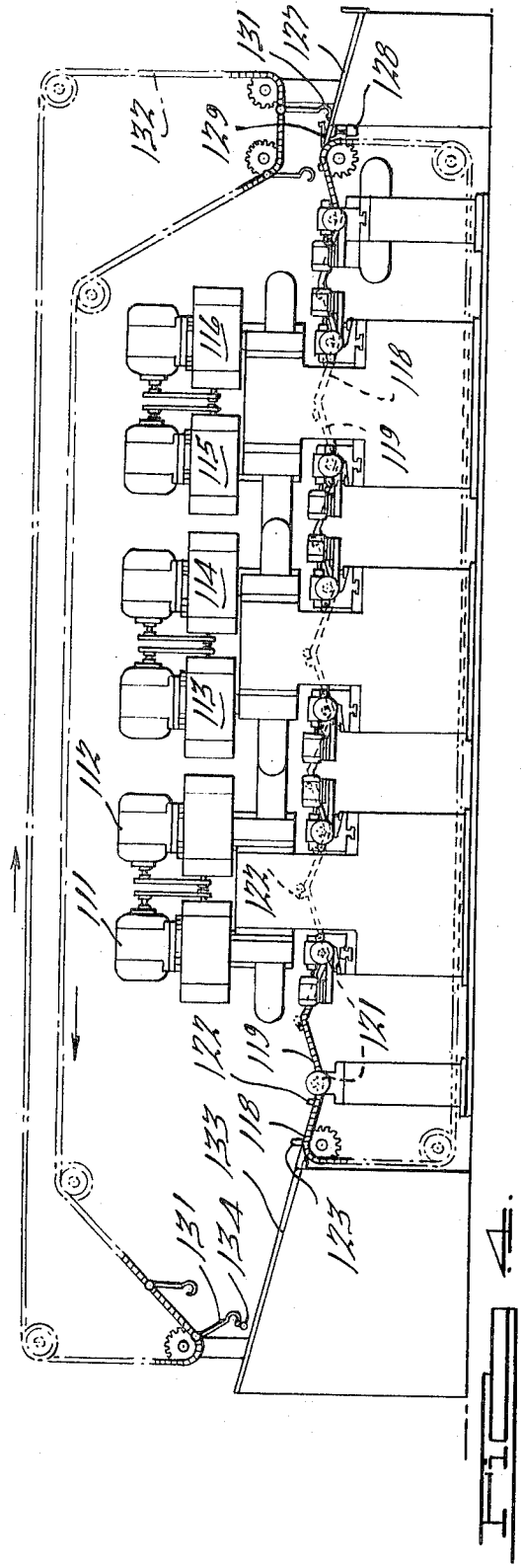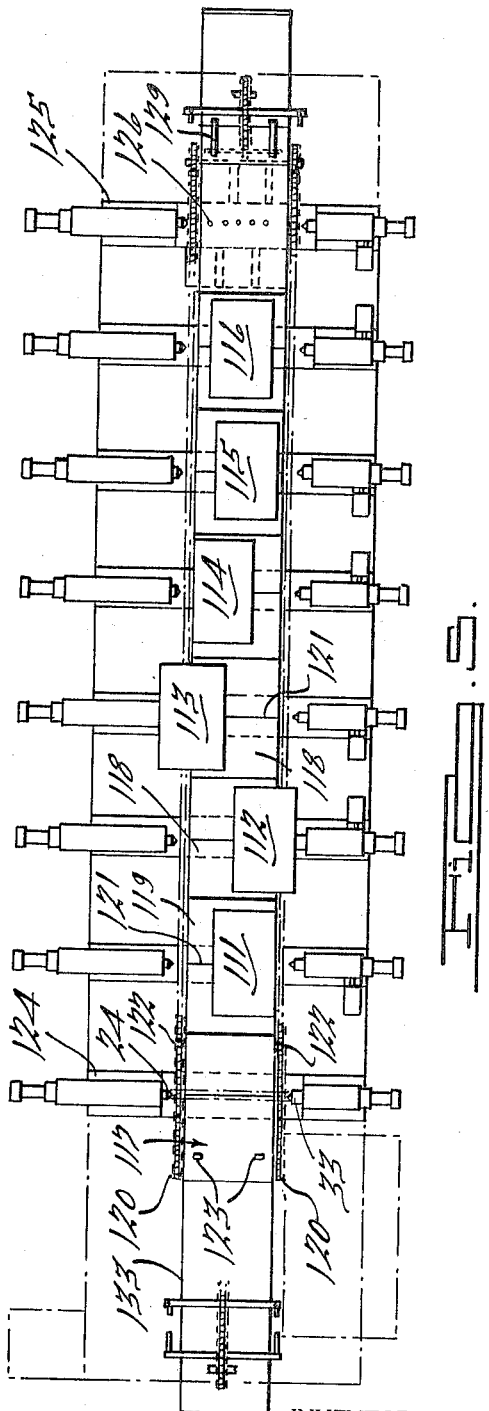

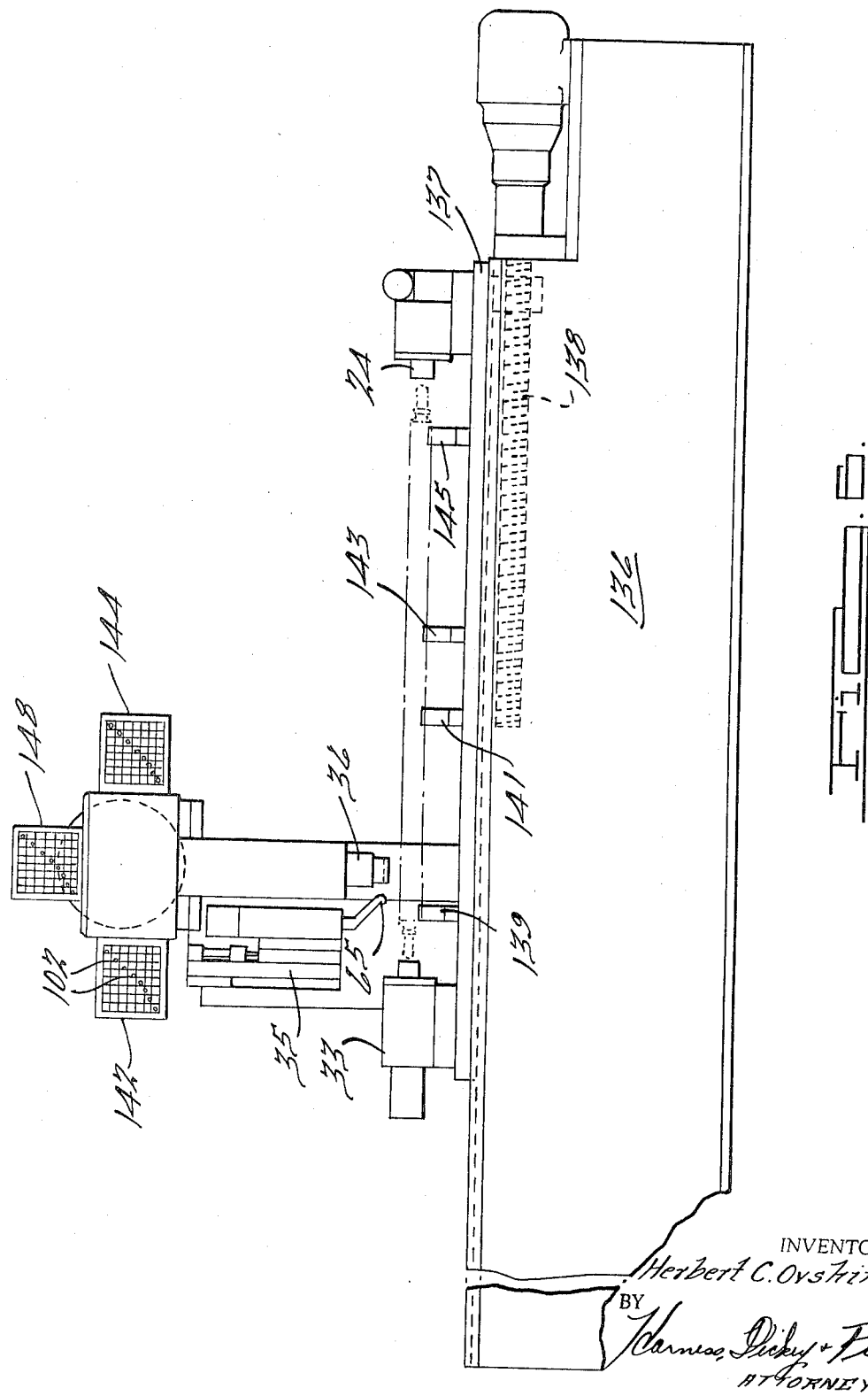

3,316,743
Patented May 2, 1967

3,316,743
STRAIGHTENING MACHINE
Herbert C. Ovshinsky, 15200 Leslie,
Oak Park, Mich. 48237
Filed July 26, 1963, Ser. No. 297,790
20 Claims. (Cl. 72—10)

This invention relates to straightening machines and particularly to a machine which automatically straightens bent shafts, rods, tubes, housings and the like.

Straightening operations are frequently required in the production of parts such as automotive axle, drive, transmission, and torsion shafts. For some parts, straightening is necessary after forging, machining, grinding, and heat treating. When shafts are straightened in a manually controlled press, work output is low. And since the overbending required to straighten a given shaft depends upon factors such as the part size, type of material, and heat treatment as well as the amount of initial distortion, a good deal of judgment and skill are required on the part of an operator.

A key element of the automatic machine is an adjustable function generator by which the straightening operation can be programmed by positioning a number of vertical sliders on a panel in accordance with a desired curve representing ram stroke versus part deformation. Once set, the sliders provide a visual display of the curve selected. Thus, when the slider settings have been established for a given part type, the information can be recorded and used in subsequent setups for that product.

Positioning of a slider in the function generator establishes an output voltage from that slider which is some value between zero and 100 percent of a fixed input voltage. When the outputs of the sliders are sampled in sequence, the resulting voltages define a curve. It is this voltage curve that forms a basis for control of the ram stroke for each work cycle. Virtually any function—linear or nonlinear—can be programmed by means of 32 sliders in the function generator.

Sampling of the outputs of the sliders is accomplished with a precision interpolating potentiometer. As the shaft of this device is roated, an integral communtator will pick up each slider voltage in succession. By means of internal circuits, the potentiometer also interpolates between successive slider voltages. Thus, the output of the potentiometer is a voltage in the form of a continuous curve representing voltage (as programmed on the sliders of the function generator) versus shaft position. Since the shaft of the potentiometer is geared to a lead screw that drives the ram, the output of the potentiometer may also be regarded—for control purposes—as voltage versus ram position.

The control system described thus far provides a preselected voltage for each position of the ram. It remains to convert this information into a means for automatically controlling the amount of overbending that will straighten a shaft at the point of force application.

To sense the amount of deformation in a shaft, the part is placed horizontally between centers in a fixture and is rotated slowly about its longitudinal axis. If the part is not straight, a probe mechanism resting on the shaft will rise and fall as the part is turned.

The probe, in the form of a two-wheel bogey, is pivoted on the end of a rod that actuates an electrical gage head. As the probe rises and falls, a voltage controlled by the gage head is changed in proportion. Thus, the output of the gage head is a voltage that corresponds to the vertical position of the probe and, hence, to the workpiece deformation at the point of measurement.

This voltage is used in two ways: first, to stop the rotation of the part in the fixture when the high point of the bend is nearest the elevated ram, and second, to provide a means of determining the proper ram stroke for the sensed deformation of the shaft.

The first objective is attained by a circuit that senses the point where the gage head voltage stops rising and begins to fall. This occurs just after the probe has been lifted to its highest point by the rotating shaft. With the arrangement, the shaft can be stopped within one degree of rotation.

The second objective—determining the proper ram stroke—requires the use of the voltage from the gage head (reflecting shaft deformation at the measuring point) and the voltage from the potentiometer (which is a function of ram position).

It should be mentioned here that the relationship between sensed part deformation and proper ram stroke is determined empirically. This is conveniently accomplished by setting the sliders of the function generator to various positions corresponding to different amounts of deformation in parts of the same type. Once a satisfactory pattern of slider settings has been established, a given lot of that type of part will be straightened uniformly regardless of normal variations in deformation from part to part.

In operation of the machine, a workpiece is placed in the fixture between the work driver of a rotary positioner and a live center.

Actuation of a Cycle Start pushbutton then causes the gage head probe to lower onto the workpiece and also starts the rotary positioner. As the workpiece rotates in the fixture, the gage head senses the amount of shaft deformation. If this deformation is within preset tolerance, the ram will not descend and the cycle will be complete.

If the amount of deformation sensed by the gage head is outside of tolerance, however, the rotary positioner will be stopped with the high point of the shaft beneath the probe. The gage head and probe will then be lifted out of the way and a ram stroke will result. The amount of downward motion of the ram will depend upon the amount of overforming that was programmed on the function generator for the amount of deformation of the part as sensed by the gage head.

In terms of control actions, the ram will descend until the voltage from the potentiometer equals that from the gage head. At this instant, a null amplifier in a control panel will reduce the bias voltage on the grid of a thyratron tube so that the tube will fire. Conduction of the thyratron tube will then cause reversal of a transmission and the ram will return to its elevated position. In this manner, a programmed ram stroke corresponding to a given part deformation will have been accomplished so as to straighten the part at a given check point. The workpiece can then be removed from the machine.

Another object of the invention is to check a workpiece to see if it is straight within set tolerances and to stop the machine operation when tolerance has been reached.

A further object of the invention is to over-bend a workpiece in the opposite direction an amount proportionate to the indicated degree of bend therein.

A still further object of the invention is to provide a visual curve pattern for a particular workpiece which controls the amount of deflection to be applied relative to the degree of deformity in the workpiece.

Another object of the invention is to balance the voltage through one potentiometer with that of another to obtain a null point which fires a thyratron to reverse the drive on the deflecting ram and return it to its initial position, and in general to provide a straightening machine which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a perspective view of a shaft straightening machine embodying the features of the present invention;

FIG. 2 is a schematic view of the operating elements of the machine which produces the sensing and straightening operation;

FIG. 3 is a view of a wiring diagram which is a part of the circuit employed with the elements illustrated in FIG. 2;

FIG. 4 is a view in elevation of a plurality of machines for producing straightening operations on a deformed workpiece;

FIG. 5 is a plan view of the machine illustrated in FIG. 4, and

FIG. 6 is a broken view in elevation of a machine in which a plurality of straightening operations can be performed on a single workpiece by the same straightening mechanism.

Referring to FIGS. 1 to 3, the machine of the present invention as herein illustrated, embodies a pedestal base 10 having a table 11 mounted thereon which supports a rail 12. When extended a substantial distance beyond the pedestal 10 outboard supports 13 may be employed at the rail ends. A plurality of blocks 14 are slidable along the rail 12 with each of the blocks containing an aperture for receiving a shaft 15 which is maintained parallel to the rail thereby. The blocks 14 above the table 11 have arms 16 secured thereto by the shaft for positioning anvil blocks 17 spaced a predetermined distance apart on the table. A bracket 18 is pivoted on the rod 15 and supported by the end block 19, the bracket being biased upwardly by a spring 21 on a stud 22 supported by the block. The bracket supports a housing 23 containing a speed reducing drive 20 for a collet 24 driven by a motor 25 through a belt drive within the cover 26. The speed reducing drive is a worm and worm wheel of conventional construction. The worm shaft has a clutch on one end and a brake on the other end which are magnetically controlled for a purpose which will be described hereinafter.

The opposite end of the table has a rail block 27 supporting a bracket 28 which is pivotally mounted on the shaft 12 and biased upwardly by a spring 29. An arm 31 is secured by a pivot 32 to the outer end of the bracket in position for supporting a tail stock 33 for pivotally supporting one end of a workpiece. By having the brackets spring pressed, the collet 24 and tail stock 31 can be moved downwardly to dispose the workpiece on the anvil blocks 17 during a test operation. An automobile drive shaft 34 is illustrated as being the workpiece being tested and straightened. One end of the drive shaft 34 is supported in the collet 24 the opposite end being supported in the tail stock 33 to be driven in rotation by the motor 25 at a desired speed. One revolution per second has proven to be a satisfactory speed of rotation, although this is merely mentioned by way of information rather than limitation.

The head of the machine carries a sensing device mounted on a slide plate 35 and a threaded ram 36 for vertical movement. The slide plate 35, as illustrated more particularly in FIG. 2 is supported on a shaft 37 operated by a piston within a cylinder 38 for movement toward and from the workpiece 34. The slide carries a first shaft 39 and a second shaft 41 disposed in aligned relation. The shaft 39 has a pinion 42 fixed thereon with its teeth in engagement with the teeth of a rack 43 which is urged downwardly by a spring 44 carried by the slide plate. A contact supporting arm 45 is frictionally secured to the shaft 39 and carries sets of contacts 46 and 47 on its upper end. A contact plate 46 bridges the contacts on a bar 48 while a contact plate 47 bridges the contacts on a bar 49. The contacts on the bars 48 and 49 are bridged when the arm 45 is moved clockwise and counterclockwise respectively, with the shaft 39 as viewed in the figure.

The shafts 39 and 41 are coupled by a magnetic clutch 51 and when the shaft 39 drives the shaft 41, a magnetic brake 52 when energized instantaneously stops its rotation. An arm 53 on the shaft 41 has a bridging finger 54 in position to bridge contacts on a bar 55. The arm 53 carries an index arm 56 having a pointer 57 disposed adjacent to an index disc 50. The bridging finger 54 is located relative to the contact bar 55 by the index arm 56 and secured in position by a set screw 58. The shaft 41 carries a gear 59 which drives a pinion 61, a shaft 62 and a wiper finger 63 of a potentiometer 64. The rack 43 carries a sensing head 65 which may be of any form, the one herein illustrated embodying a carriage 66 pivotally secured on the end of the rack 43 by a pivot 67 with a pair of spaced rollers 68 at the bottom. This particular type of head is useful when a rough seam is present on the workpiece to permit the carriage to ride thereover without providing an indication to be uneffected by irregularities on the workpiece.

The threaded ram 36 is driven by a worm wheel 69 from a worm 71 and a belt drive 72 from a countershaft 73. The countershaft 73 carries a pulley 74 and a gear 75 which are fixed thereto. A shaft 76 has a gear 77 thereon with its teeth in mesh with the teeth of the gear 75. The gear 77 is secured to the shaft 76 by a magnetic clutch 78. A pulley 79 is secured to the shaft 76 by a magnetic clutch 82 and is connected to the pulley 74 by a belt 81. The shaft 76 has a pulley 83 driven by a belt 84 from a pulley 85 on the shaft of a motor 86. When the clutch 82 is engaged to secure the pulley 79 to the shaft 76, the worm 71 drives the worm wheel 69 to move the threaded ram 36 downwardly. When the clutch 78 is energized after the clutch 82 is deenergized, the drive through the gears 75 and 77 reverses the rotation of the worm 71 and wheel 69 and moves the threaded ram upwardly away from the workpiece 34.

The threaded ram 36 has a beveled gear 87 in mesh with a beveled gear 88 which drives a precision interpolating potentiometer 89, the conductors from which in a cable 91 are connected to a function generator 92. The interpolating potentiometer and the function generator are of a type procurable from Perkin Elmer Corporation of Norwalk, Connecticut. A pair of conductors 93 and 94 extend from the potentiometers 64 and 89 to be connected in a balancing circuit.

As the slide plate 31 is lowered, the sensing head 65 will engage the workpiece 34 and the wiping finger 63 will be adjusted to control the amount of voltage delivered from the potentiometer 64. This voltage will pass through a winding 95 of a transformer 96, the secondary winding 97 of which delivers a voltage to a circuit which includes a thyratron 98 for maintaining the circuit therethrough in open position. As the potentiometer 89 is adjusted an amount conforming to the downward movement of the threaded ram 36, the voltage delivered therethrough will be decreasing. When the voltage through the two potentiometers balance, a null point is reached and no voltage will be delivered through the transformer to the thyratron which will "fire" closing the circuit therethrough. This reverses the circuits to the magnetic clutches 78 and 82 and the drive of the worm and worm wheel 69 and 71 to return the ram to its initial position. The voltage impressed across the potentiometer 64 is an indication of how much deformation is present in the length of the workpiece being checked. The degree of overbending required is found empirically for the metal, size and shape of a particular workpiece and this is set in the function generator 92 for different degrees of deformation providing a visual curve for each type of workpiece. If the voltage is indicated as an amount 99 on the ordinate and the desired deflection is 101 on the abscissa, a slider 102 intersetcs the intersection of the two points on the curve. When the voltage across the potentiometer 89 produces a null point across the transformer 96, this amount of the required deflection has been applied to the workpiece by the threaded ram 36. Upon the closing of the circuit through the thyratron 98, the drive for the threaded ram 36 is reversed and the ram is returned to its starting position at which a switch 146 is operated to repeat the cycle. The cycle is contained until the deflection is within a set tolerance when the machine is stopped and the workpiece removed.

The tolerance is checked by an arm 53 which is adjustably mounted on the shaft 41. The indicator 57 is set relative to the index disc 50 to position the bridging finger 54 a predetermined distance from the contact bar 55. The arm 53 is then locked on the shaft 41 by a set screw 58 and each time the shaft 41 rotates the bridging finger 54 will engage the contacts 55 if the sensing device indicates that the workpiece is bent beyond the allowable amount. When the workpiece has straightened to a degree within the tolerance, the bridging finger 54 will not be advanced sufficiently to engage the contacts of the bar 55 and indication is provided that the workpiece has been straightened. A finger 105 on the tail stock 33 strikes an arm 106 of a switch 107 each revolution of the collet. The second time the finger 105 strikes the arm 106 when the contacts of the bar 55 are not engaged, an indication is provided that the workpiece has been straightened, the operation is stopped and the slide plate 35 is retracted. The workpiece is removed and a new workpiece to be checked and straightened is inserted between the tail stock 33 and the collet 24. The slide of the sensing device 35 and the threaded ram are in retracted position.

A cycle start button such as switch button 108 is operated to lowerf the sensing device slide plate 35 and start an automatic cycle, otherwise a number of switches in the box 110 can be used for manual operation. The operation of the switch button 108 also energizes the motor 25 to rotate the workpiece 34 by releasing a magnetic brake 104 and energizing a magnetic clutch 103. The slide plate 35 moves downwardly to a positive stop which is adjustable for different workpieces to locate the sensing head 65 thereon. This moves the rack upwardly to rotate the shaft 39 to the mid position of the rack since a "high" or "low" point on the workpiece may first be engaged. The sensing of a workpiece to begin a straightening cycle occurs when the sensing head is passing from the low to the higher point on the workpiece as it is rotated. The high point could also be obtained by sensing from the high to the low point on the workpiece. Should sensing occur initially during the approach to the "low" side from the "high" side, the contacts 49 are broken and the contacts 48 are bridged, the former indicating the upward movement of the rack 43, the latter indicating the downward movement thereof. After the rack 43 and sensing head 65 have reached the lowermost position and starts upwardly, the arm 44 will swing counterclockwise thereby bridging the contacts 49 and breaking the contacts 48. The energizing of the circuit across the contacts 49 produces the release of the brake 52 and the engagement of the clutch 51 so that the upward movement of rack 43 will rotate the gear 42 and shafts 39 and 41. The finger 63 will be moved relative to the potentiometer 64 and the arm 53 and the finger 54 will be swung toward bridging position of the contacts of the bar 55. If the deformation in the shaft 34 is not sufficient to move the rack 43 upwardly a sufficient amount to cause the finger 54 to bridge the contacts of the bar 55, the circuit is such as to prevent the actuation of the threaded ram 36. The switch 107 energizes a holding relay which if closed during the second time the switch 107 is actuated the circuits are interrupted, the rotating collet 24 stopped and the slide plate 35 of the sensing device is raised through the operation of the piston within the cylinder 38. The second operation of the switch without the circuits being changed, indicates that the deformation of the workpiece is within tolerance and that it requires no straightening.

If, however, the bridging finger 54 bridge the contacts of the bar 55 indicating that deformation of the workpiece 34 is greater than the allowed tolerance, the continued upward movement of the rack 43 will operate the finger 63. Immediately upon reaching the high point and as the rack 43 starts to move downwardly, the arm 45 is moved clockwise opening the circuit through the contacts of the bar 49 and bridging the contacts of the bar 48. Upon completing the circuit across the contacts of the bar 48, the clutch 103 is released and the brake 104 is applied to instantaneously stop the driving of the collet 24 and the rotation of the workpiece. This positions the high point of the workpiece 34 substantially beneath the threaded ram 36. Any lag between the position of the "high" point and the ram can be compensated for by offsetting the sensing head 65 angularly ahead of the ram. The slide plate 35 of the sensing device is moved to its uppermost position by the operation of the piston within the cylinder 38 with the elements thereof locked in fixed relation by the brake 52. At the end of the upward movement, a circuit is completed by the actuation of a switch 80. If the contacts 55 are bridged the clutch 78 is released and the clutch 82 engaged to drive the worm 71 and worm wheel 69. This forces the threaded ram 36 downwardly and actuates the potentiometer 89 through the driving of the gears 87 and 88. This drive will continue until the voltage through the potentiometer 89 equals the voltage through the potentiometer 64 which produces a null in the voltage supplied to the thyratron 98 which is "fired" to close its circuit. This reverses a circuit to release the clutch 82 and apply the clutch 78 which reverses the drive on the threaded ram 36 and returns it to its initial position. During the upward movement of the threaded ram 36, the brake 52 of the sensing mechanism is released permitting the spring 44 to move the rack 43 downwardly and reset the finger 63 of the potentiometer 64 and the bridging finger 54 of the arm 53.

Very little time is required to reset the fingers 54 and 63, and this occurs before the threaded ram 36 reaches the top of its stroke whereupon the switch 146 is actuated to open the clutch 51 so that the rack 43 is free to move down to a stop position indicated by a finger 109. Upon the operation of the clutch 51, the circuit is established to lower the slide plate 35 of the sensing device to again have the sensing head 65 of the rack 43 engage the workpiece 34 and repeat the cycle above indicated. If in this cycle the wiper finger 54 of the arm 55 does not bridge the contacts of the bar 55, an indication is given that the deformation of the workpiece 34 is within the acceptable tolerance and upon the second rotation of the tail stock 33 and the second striking of the arm 106 of the switch 107 by the finger 105, a circuit is completed to retract the slide plate 35 of the sensing device so that the workpiece can be removed. If, however, the bridging finger 54 of the arm 53 bridges the contacts of the bar 55, then the entire cycle will be repeated but at a lower level indicated by another slider 102 on the curve and the threaded ram will move down a shorter distance since the majority of deformations had been removed in the prior cycle. After the completion of the second cycle and at the beginning of the third cycle, a check will be made to ascertain whether deformation is within the allowable limits and if so, the sensing device will be raised so that the workpiece can be removed. The application of and the removal of the workpieces are preferably automatic, the table being so constructed as to have one piece roll therefrom while another piece advances into position to be picked up by the tail stock 33 and the collet 24 upon the occurrence of which the circuitry is again energized to start a complete cycle.

The function generator 92 simplifies the operation of the threaded ram by providing a ratio between error and ram movement depending upon the amount of deformation present in the workpiece and the amount of overbending required. The plurality of sliders 102 can be set as a visual graph which conforms to the particular workpiece to be tested so that for the amount of error sensed by the sensing head 65 a proper amount of deflection will be applied to the workpiece. This amount, as pointed out above, was found empirically for each type of workpiece to be tested so that the sliders may be set by number or be a template each time that particular type of work is to be checked and straightened. In application, if a voltage indication of 6 volts, for example, is furnished through the potentiometer 64 and indicated at 99 on the function generator 92, the amount of downward movement of the threaded ram 36 will be indicated at 101 thereon and this amount of downward movement will occur to the threaded ram 36 when the voltage from the potentiometer 89 reaches 6 volts to produce a null point with no voltage delivered from the transformer 96 which will "fire" the thyratron 98. The function generator provides a simple way of providing a visual curve for the operation of the device, one which may be set up for different types of workpieces which are to be straightened.

While the particular sensing device has been illustrated as being applied to a straightening machine, it is to be understood by those skilled in the art that the device can be used on many other types of machines. For example, when applied to a lathe, the sensing head 65 will follow a template as the workpiece is advanced and the tool, which will take the place of the threaded ram 36, will be moved in and out following the inward and outward movement of the sensing head 65. In this arrangement the sensing will occur on both sides of the null point rather than on just one as indicated above so that the tool would be controlled when it is moved up or down or in or out relative to the workpiece.

While a single machine with a single station has been illustrated and described hereinabove by way of example, it is to be understood that multiple types of machines may be employed, one of which is illustrated in FIGS. 4 and 5. In this arrangement a plurality of machines 111, 112, 113, 114, 115 and 116 are disposed in aligned relation. An undulated table 117 is provided from one machine to the other having V-shaped sections embodying portions 118 which slope downwardly and portions 119 which slope upwardly from an apex 121 located between the tail stock 33 and the collet 24 of each machine. A pair of chains 120 is mounted on the machine having fingers 122 extending upwardly therefrom which pick off the endmost workpiece 34. The endmost workpiece is located by a pair of spring pressed fingers 123 and hinge downward as the chains advance the workpiece after which the chains are stopped. This permits the workpiece to roll down the first portion 118 to the apex 121 where it is picked up by the tail stock 33 and collet 24 of a checking machine 124. The checking machine 124 makes certain that the shaft is properly oriented lengthwise so they can be picked by the machines of the series. After each straightening operation the chains are advanced to move the shafts from one of the machines to the next machine of the series. The chains move the shafts up and over the inclined portions 119 and are then stopped, permitting the shafts to roll down the inclined portions 118 into the apexes 121 of the table and delivered to the next machines of the series.

All of the machines function simultaneously to pick up the shafts and run through the test cycle and when all of the shafts have been straightened to within the allowable tolerance, circuits are completed to again advance them from one machine to the next where bending operations are performed at different points in the length thereof. After the shafts pass from the machine 116, they move into a checking machine 125 where all of the spots which were straightened are tested by plunger devices 126. When the plunger devices indicates a workpiece has been straightened to within allowable tolerance, it is advanced onto a downwardly sloping table 127 on which the workpieces are collected and removed. Should one of the shafts fail to pass the checking test due to deformation, a solenoid 128 raises fingers 129 in the table 127 for a time sufficient to permit a pair of hooks 131 on a conveyor chain 132 to pick up the shaft and carry it forward onto the loading platform 133 where it is delivered from the pair of hooks 131 as the hooks are tilting over a stop bar 134.

Referring to FIG. 6, a further form of the invention is illustrated that wherein a machine bed 136 has a table 137 thereon advanced by a lead screw 138 to different positions upon the bed. The table carries the tail stock 33 and the driving collet 24 for supporting and rotating the workpiece relative to the sensing head 65 which is herein illustrated as a ball end located adjacent to the threaded ram 36. The slide plate 35 for the sensing device is lowered to have the sensing head 65 engage a workpiece for checking the deformation thereof in the same manner as pointed out hereinabove. If the workpiece at the point to be straightened is deformed beyond the permissive tolerance then the cycle is continued to have the ram 36 move down a predetermined distance depending upon the amount of deflection indicated by the sensing head 65. For the area between the blocks 139 and 141 a function generator 142 is employed having the graph set thereon by the plurality of sliders 102. After the straightening cycle and the checking of the section between the blocks 139 and 141 is shown to be within tolerances then the table 137 is advanced to have the portion of the workpiece between the blocks 141 and 143 move into sensing and straightening position. The cycle is repeated using a function generator 144 for checking the portion of the workpiece between the two blocks 141 and 143 and if straightening is required then the cycle will be repeated until the length between the blocks checks out within the permitted tolerance. Thereafter the table is advanced to have a section between the blocks 143 and 145 checked and if necessary straightened to within the preferred tolerance by using a function generator 148. After the entire length of the workpiece has been straightened, it may be removed and the table returned to its initial position and the cycle repeated for a new workpiece. Any number of positions may be set up throughout the length of the workpiece to be checked and straightened, and after a straightening cycle the operation can be repeated to run a final check on the workpiece.

What is claimed is:
1. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the first workpiece rotation for ascertaining whether the deformation of the workpiece is within an allowable tolerance, and means actuated upon the second rotation of the workpiece to stop the operation if the deformation in the workpiece proved to be within allowable tolerance.

2. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the workpiece rotation for stopping the rotation of the workpiece when the high side has been reached, means for withdrawing the sensing head from the workpiece, and means for advancing force-applying means to engage and bend the workpiece from the high side thereof.

3. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the workpiece rotation for stopping the rotation of the workpiece when the high side has been reached, means for withdrawing the sensing head from the workpiece, means for advancing force-applying means to engage and bend the workpiece from the high side thereof, means controlled by the movement of the head when at the high side for indicating the amount of downward movement to be applied to the force-applying means to produce a desired degree of bend in the workpiece, and means for retracting the force-applying means after it reaches the end of its downward movement.

4. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the workpiece rotation for stopping the rotation of the workpiece when the high side has been reached, means for withdrawing the sensing head from the workpiece, means for advancing force-applying means to engage and bend the workpiece from the high side thereof, means controlled by the movement of the head when at the high side for indicating the amount of downward movement to be applied to the force-applying means to produce a desired degree of bend in the workpiece, means for retracting the force-applying means after it reaches the end of its downward movement, and means thereafter for lowering the sensing head and checking the workpiece to ascertain whether or not it is within the allowable tolerance.

5. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the workpiece rotation for stopping the rotation of the workpiece when the high side has been reached, means for withdrawing the sensing head from the workpiece, means for advancing force-applying means to engage and bend the workpiece from the high side thereof, and a pair of indicating devices actuated by the sensing head and by the downward movement of the force-applying means to stop the latter when the indicating devices are balanced.

6. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the workpiece rotation for stopping the rotation of the workpiece when the high side has been reached, means for withdrawing the sensing head from the workpiece, means for advancing force-applying means to engage and bend the workpiece from the high side thereof, a pair of indicating devices actuated by the sensing head and by the downward movement to the force-applying means to stop the latter when the indicating devices are balanced, and a function generator to which each indicating device is connected to obtain a visual graph of the amount of over-bending required for the amount of deformation present in the workpiece.

7. In a straightening machine for elongated workpieces, a base of said machine, a rotatable tail stock and driving collet on said base for supporting said workpiece, driving means for rotating said collet having a brake thereon, a pair of blocks on said base on which said workpiece rests when being bent therebetween, a sensing device having a sensing head, means for moving said device toward said workpiece to engage the head therewith, a ram movable downwardly into engagement with the workpiece portion located between the blocks, means for lowering and raising said ram independent of said sensing device, and means actuated by the head during the rotation of said workpiece for first checking the workpiece to see whether the bend thereof is within permissible tolerance.

8. In a straightening machine for elongated workpieces, a base for said machine, a rotatable tail stock and driving collet on said base for supporting said workpiece, driving means for rotating said collet having a brake thereon, a pair of blocks on said base on which said workpiece rests when being bent therebetween, a sensing device having a sensing head movable toward said workpiece to engage the head therewith, a ram movable downwardly into engagement with the workpiece portion located between the blocks, means for lowering and raising said ram, means actuated by the head during the rotation of said workpiece for first checking the workpiece to see whether the bend thereof is within permissible tolerance, and means interrupting the operation when the workpiece is found to be within the allowable tolerance.

9. In a straightening machine for elongated workpieces, a base for said machine, a rotatable tail stock and driving collet on said base for supporting said workpiece, driving means for rotating said collet having a brake thereon, a pair of blocks on said base on which said workpiece rests when being bent therebetween, a sensing device having a sensing head movable toward said workpiece to engage the head therewith, a ram movable downwardly into engagement with the workpiece portion located between the blocks, means for lowering and raising said ram, means actuated by the head during the rotation of said workpiece for first checking the workpiece to see whether the bend thereof is within permissible tolerance, and means operated by the increased movement of the head when the workpiece is not within the allowable tolerance to move the ram downwardly to engage and bend the workpiece at the high point thereof a predetermined amount.

10. In a straightening machine for elongated workpieces, a base for said machine, a rotatable tail stock and driving collet on said base for supporting said workpiece, driving means for rotating said collet having a brake thereon, a pair of blocks on said base on which said workpiece rests when being bent therebetween, a sensing device having a sensing head movable toward said workpiece to engage the head therewith, and means responsive to the further downward movement of the head from the high to a low position as the workpiece is rotated for connecting a drive to a potentiometer finger which is advanced a predetermined amount depending upon the degree of movement of the head from the low to the high point of the workpiece.

11. In a straightening machine for elongated workpieces, a base for said machine, a rotatable tail stock and driving collet on said base for supporting said workpiece, driving means for rotating said collet having a brake thereon, a pair of blocks on said base on which said workpiece rests when being bent therebetween, a sensing device having a sensing head movable toward said workpiece to engage the head therewith, means responsive to the lowering of the head as it passed the high point for applying the brake on the collet drive for stopping the rotation of the workpiece with the high point adjacent to the head and the ram, and means for thereafter moving the ram downwardly for producing the bending operation.

12. In a straightening machine for elongated workpieces, a base for said machine, a rotatable tail stock and driving collet on said base for supporting said workpiece, driving means for rotating said collet having a brake thereon, a pair of blocks on said base on which said workpiece rests when being bent therebetween, a sensing device having a sensing head movable toward said workpiece to engage the head therewith, a first potentiometer responsive to the lowering of the head as it passed the high point for applying the brake on the collet drive for stopping the rotation of the workpiece with the high point adjacent to the head and the ram, means for thereafter moving the ram downwardly for producing the bending operation, a second potentiometer, and means operated by the degree of downward movement of the ram for changing the voltage through the second potentiometer, and means responsive to the voltage through said two potentiometers for reversing the ram and limit the amount of deflection produced on the workpiece.

13. In a straightening machine for elongated workpieces, a base for said machine, a rotatable tail stock and driving collet on said base for supporting said workpiece, driving means for rotating said collet having a brake thereon, a pair of blocks on said base on which said workpiece rests when being bent therebetween, a sensing device having a sensing head movable toward said workpiece to engage the head therewith, a first potentiometer responsive to the lowering of the head as it passed the high point for applying the brake on the collet drive for stopping the rotation of the workpiece with the high point adjacent to the head and the ram, means for thereafter moving the ram downwardly for producing the bending operation, a second potentiometer, and means operated by the degree of downward movement of the ram for changing the voltage through the second potentiometer and means responsive to the voltage through said two potentiometers for reversing the ram and limit the amount of deflection produced on the workpiece, said responsive means being a function generator having sliders thereon which provides a visual graph set for the error sensed and the degree of bend to be produced by the ram.

14. In a straightening machine for elongated workpieces, a base for said machine, a rotatable tail stock and driving collet on said base for supporting said workpiece, driving means for rotating said collet having a brake thereon, a pair of blocks on said base on which said workpiece rests when being bent therebetween, a sensing device having a sensing head movable toward said workpiece to engage the head therewith, a first potentiometer responsive to the lowering of the head as it passed the high point for applying the brake on the collet drive for stopping the rotation of the workpiece with the high point adjacent to the head and the ram, means for thereafter moving the ram downwardly for producing the bending operation, a second potentiometer, and means operated by the degree of downward movement of the ram for changing the voltage through the second potentiometer and means responsive to the voltage through said two potentiometers for reversing the ram and limit the amount of deflection produced on the workpiece, and a thyratron for reversing the movement of the ram fired upon the nulling of the voltage through the potentiometers.

15. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the first workpiece rotation for ascertaining whether the deformation of the workpiece is within an allowable tolerance, means actuated upon the second rotation of the workpiece to stop the operation if the deformation in the workpiece proved to be within allowable tolerance; means for removing the workpiece from the supporting means, and means for delivering another workpiece thereto.

16. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the workpiece rotation for stopping the rotation of the workpiece when the high side has been reached, means for withdrawing the sensing head from the workpiece, means for advancing force-applying means to engage and bend the workpiece from the high side thereof, means controlled by the movement of the head when at the high side for indicating the amount of downward movement to be applied to the force-applying means to produce a desired degree of bend in the workpiece, means for retracting the force-applying means after it reaches the end of its downward movement, means thereafter for lowering the sensing head and checking the workpiece to ascertain whether or not it is within the allowable tolerance, and means for removing the workpiece from the supporting means and advancing it to the supporting means of a second straightening device as a workpiece to be straightened is delivered to the supporting means of the first machine.

17. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the first workpiece rotation for ascertaining whether the deformation of the workpiece is within an allowable tolerance, means actuated upon the second rotation of the workpiece to stop the operation if the deformation in the workpiece proved to be within allowable tolerance; means for removing the workpiece from the supporting means, means for checking the points straightened on the workpiece as it is advanced from the straightening device, means for ejecting a workpiece which fails to pass the checking test, and a conveyor for returning the ejected workpiece to the straightening device for further straightening operations.

18. In a straightening device for an elongated workpiece, supporting means for the workpiece, means for rotating the workpiece, means for stopping the rotation of the workpiece, a sensing head movable into engagement with the workpiece to be in contact therewith during the rotation thereof, means actuated by the movement of the head during the workpiece rotation for stopping the rotation of the workpiece when the high side has been reached, means for withdrawing the sensing head from the workpiece, means for advancing force-applying means to engage and bend the workpiece from the high side thereof, means controlled by the movement of the head when at the high side for indicating the amount of downward movement to be applied to the force-applying means to produce a desired degree of bend in the workpiece, means for retracting the force-applying means after it reaches the end of its downward movement, means thereafter for lowering the sensing head and checking the workpiece to ascertain whether or not it is within the allowable tolerance, and means for advancing the workpiece to have another portion thereof positioned under the head and force-applying means to have the workpiece straightened at said another portion thereof.

19. In a straightening machine for elongated workpieces, a base for said machine, a rotatable support for the workpiece on said base, a sensing device having a sensing head movable toward the workpiece to engage the head therewith, a ram movable into engagement with the workpiece, means for advancing and retracting said ram, means actuated by the head during the rotation of the workpiece for first checking the workpiece to see whether the deformation thereof is within permissible tolerance, and means operated by the increased movement of the head when the workpiece is not within the allowable tolerance to move the ram to engage and bend the workpiece at the high point thereof a predetermined amount.

20. In a work performing machine, a base for supporting and driving a workpiece, a sensing device having a sensing head, a work performing member movable toward and away from the workpiece, a first potentiometer operated by the movement of the head, a second potentiometer operated by the movement of the work performing member, and means responsive to the voltage through said two potentiometers to control the position of said work performing member relative to the workpiece.

References Cited by the Examiner
UNITED STATES PATENTS

| | | | |
|---|---|---|---|
| 533,713 | 2/1895 | Leighton | 72—10 |
| 1,499,100 | 6/1924 | Ekstrom | 72—34 |
| 2,426,390 | 8/1947 | De Forest | 72—389 |
| 3,208,250 | 9/1965 | Fournier | 72—10 |

CHARLES W. LANHAM, *Primary Examiner.*

L. A. LARSON, *Assistant Examiner.*